(12) United States Patent
Williams et al.

(10) Patent No.: US 9,863,322 B2
(45) Date of Patent: Jan. 9, 2018

(54) SELECTIVELY DEOXYGENATED STORED FUEL SYSTEM

(71) Applicant: United Technologies Corporation, Hartford, CT (US)

(72) Inventors: Alexander W. Williams, Windsor Locks, CT (US); Stephen K. Kramer, Cromwell, CT (US)

(73) Assignee: United Technologies Corporation, Farmington, CT (US)

( * ) Notice: Subject to any disclaimer, the term of this patent is extended or adjusted under 35 U.S.C. 154(b) by 381 days.

(21) Appl. No.: 14/599,855

(22) Filed: Jan. 19, 2015

(65) Prior Publication Data

US 2015/0204244 A1    Jul. 23, 2015

Related U.S. Application Data

(60) Provisional application No. 61/930,583, filed on Jan. 23, 2014.

(51) Int. Cl.

| F02C 7/232 | (2006.01) |
|---|---|
| F02C 7/22 | (2006.01) |
| F02C 9/40 | (2006.01) |
| F23K 5/04 | (2006.01) |
| F23K 5/08 | (2006.01) |

(52) U.S. Cl.
CPC ............... F02C 7/232 (2013.01); F02C 7/22 (2013.01); F02C 9/40 (2013.01); F23K 5/04 (2013.01); F23K 5/08 (2013.01); F05D 2260/607 (2013.01); F05D 2260/95 (2013.01); F23D 2900/00016 (2013.01); F23R 2900/00004 (2013.01); Y02T 50/671 (2013.01); Y02T 50/675 (2013.01)

(58) Field of Classification Search
CPC .... F02C 7/232; F02C 7/22; F02C 9/40; F02C 7/228; F02C 3/20; F02C 7/222; F23K 5/04; F23K 5/08; F05D 2260/607; F05D 2260/95; Y02T 50/671; Y02T 50/675; F23R 3/36; F23D 2209/30
USPC ......................................................... 60/776
See application file for complete search history.

(56) References Cited

U.S. PATENT DOCUMENTS

| 5,735,117 A | 4/1998 | Toelle | |
|---|---|---|---|
| 6,315,815 B1 * | 11/2001 | Spadaccini | ........ B01D 19/0031 95/46 |
| 6,955,040 B1 | 10/2005 | Myers, Jr. et al. | |
| 7,036,302 B2 | 5/2006 | Myers, Jr. et al. | |
| 7,726,112 B2 | 6/2010 | Dooley | |
| 7,841,184 B2 | 11/2010 | Dooley | |
| 8,607,571 B2 | 12/2013 | Williams et al. | |
| 2004/0221582 A1 | 11/2004 | Howell et al. | |
| 2009/0020013 A1 * | 1/2009 | Sloan | ................. B01D 19/0031 96/4 |

(Continued)

*Primary Examiner* — Jason Shanske
*Assistant Examiner* — Jason T Newton
(74) *Attorney, Agent, or Firm* — Carlson, Gaskey & Olds, P.C.

(57) ABSTRACT

A gas turbine engine includes a multi-stage fuel injection system including at least a first fuel injection stage and a second fuel injection stage, a first fuel reservoir fluidly connected to the first fuel injection stage and fluidly connected to a selective valve, and a second fuel reservoir fluidly connected to the selective valve. The selective valve connects one of the first fuel reservoir and the second fuel reservoir to the second fuel injection stage.

17 Claims, 4 Drawing Sheets

(56) References Cited

U.S. PATENT DOCUMENTS

| | | |
|---|---|---|
| 2009/0145131 A1 | 6/2009 | Kreutle et al. |
| 2010/0024770 A1* | 2/2010 | Pursifull ............ F02M 37/0088 123/446 |
| 2013/0098041 A1* | 4/2013 | Zhang .................... F23K 5/005 60/734 |
| 2013/0098056 A1* | 4/2013 | Zhang .................... F02C 3/305 60/775 |
| 2013/0255489 A1* | 10/2013 | Jalbert ...................... F02C 7/22 95/46 |

* cited by examiner

SELECTIVELY DEOXYGENATED STORED FUEL SYSTEM

CROSS-REFERENCE TO RELATED APPLICATION

This application claims priority to U.S. Provisional Application No. 61/930,583 filed on Jan. 23, 2014.

TECHNICAL FIELD

The present disclosure relates generally to fuel systems for a gas turbine engine, and more particularly to a selectively deoxygenated stored fuel system for the same.

BACKGROUND

Efficient low emission gas turbine engines are a goal of the gas turbine industry. In particular, NOx emissions are regulated by government agencies and international agreements. Similarly, particulate matter emissions can be limited by government regulatory bodies. In order to reduce emissions from gas turbines, staged, lean burn combustors have been implemented. Staged burn combustors refer to combustor's having a staged fuel system where a first stage of fuel injectors is on during a portion of the engine operational envelope and other fuel stages are turned on and off to respond to operational requirements.

As a result of the staged fuel injections, fuel may remain stagnant in the fuel line and injector nozzles of a stage different portions of the operational envelope. The stagnant fuel may be exposed to extreme temperatures and can cause coking within the fuel line of the injector nozzle. Coking is the formation of a carbonous matter in the fuel, and the coking can result in clogged fuel nozzles, decreased efficiency and damage to the fuel nozzles themselves.

SUMMARY OF THE INVENTION

In a featured embodiment, a gas turbine engine includes a multi-stage fuel injection system including at least a first fuel injection stage and a second fuel injection stage, a first fuel reservoir fluidly connected to the first fuel injection stage and fluidly connected to a selective valve, a second fuel reservoir fluidly connected to the selective valve, and wherein the selective valve connects one of the first fuel reservoir and the second fuel reservoir to the second fuel injection stage.

Another embodiment according to the previous embodiment, further includes a fuel de-oxygenation unit having a fuel outlet fluidly coupled to the second fuel reservoir.

In another embodiment according to any of the previous embodiments a fuel inlet of the fuel de-oxygenation unit is fluidly coupled to the first fuel reservoir.

Another embodiment according to any of the previous embodiments further includes a controller controllably coupled to the selective valve, and wherein the controller is operable to control a state of the selective valve.

In another embodiment according to any of the previous embodiments the selective valve fluidly couples the first fuel reservoir to the first fuel injection stage when the selective valve is in a first state, and wherein the selective valve fluidly connects the second fuel reservoir to the second fuel injection stage when the selective valve is in a second state.

In another embodiment according to any of the previous embodiments the first fuel injection stage comprises a plurality of fuel injection nozzles, and wherein the second fuel injection stage comprises a plurality of fuel injection nozzles.

In a featured embodiment a method for preventing fuel coking in a multi-stage fuel injection system includes transitioning from a first mode of engine operations to a second mode of engine operations by at least connecting a second fuel injector stage of a multi-stage fuel injection system to a de-oxygenated fuel reservoir, operating the second fuel injector stage for at least a predefined time period, thereby ensuring that all fuel within the second fuel injector stage is de-oxygenated fuel, and switching off the second fuel injector stage, thereby allowing de-oxygenated fuel to remain stagnant in the second fuel injector stage.

Another embodiment according to the previous embodiment further includes de-oxygenating fuel from a main fuel reservoir using an on-board fuel de-oxygenation unit, and providing the de-oxygenated fuel to from the on-board fuel de-oxygenation unit to the de-oxygenated fuel reservoir.

In another embodiment according to any of the previous embodiments the step of connecting a second fuel injector stage of a multi-stage fuel injection system to a de-oxygenated fuel reservoir comprises operating a selective valve connected to an input of the second fuel injector stage.

In another embodiment according to any of the previous embodiments operating the selective valve comprises switching the input of the selective valve from a main fuel reservoir to the de-oxygenated fuel reservoir.

In another embodiment according to any of the previous embodiments the state of the selective valve is controlled by a controller.

In another embodiment according to any of the previous embodiments the de-oxygenated fuel in the second fuel injector stage while the second fuel injector stage is exposed to temperatures in excess of the coking temperature on non-de-oxygenated fuel.

In a featured embodiment a gas turbine fuel injection system includes a first fuel injector stage having a plurality of fuel injector nozzles, at least one additional fuel injector stage having a plurality of fuel injector nozzles, a main fuel module connected to the first fuel injector stage via a main fuel line, a selective valve having a first input, and second input and an output, the output of the selective valve being connected to the second fuel injector stage, and a de-oxygenated fuel reservoir connected to a selective valve one of the first input and the second input, and the main fuel line being connected to the other of the first fuel input and the second fuel input.

Another embodiment according to the previous embodiment further includes a controller coupled to the selective valve and operable to control a state of the selective valve.

In another embodiment according to any of the previous embodiments the controller is further controllably coupled to the main fuel module and is operable to control the main fuel module.

In another embodiment according to any of the previous embodiments the main fuel module comprises at least a fuel pump and a main fuel reservoir.

Another embodiment according to any of the previous embodiments further includes a fuel de-oxygenator fluidly coupled to the main fuel line such that at least a portion of fluid flowing through the main fuel line is diverted to the fuel de-oxygenator.

In another embodiment according to any of the previous embodiments the fuel de-oxygenator comprises an output, and wherein the output is fluidly connected to the de-oxygenated fuel reservoir.

These and other features of the present invention can be best understood from the following specification and drawings, the following of which is a brief description.

DETAILED DESCRIPTION OF AN EMBODIMENT

Figure 1:
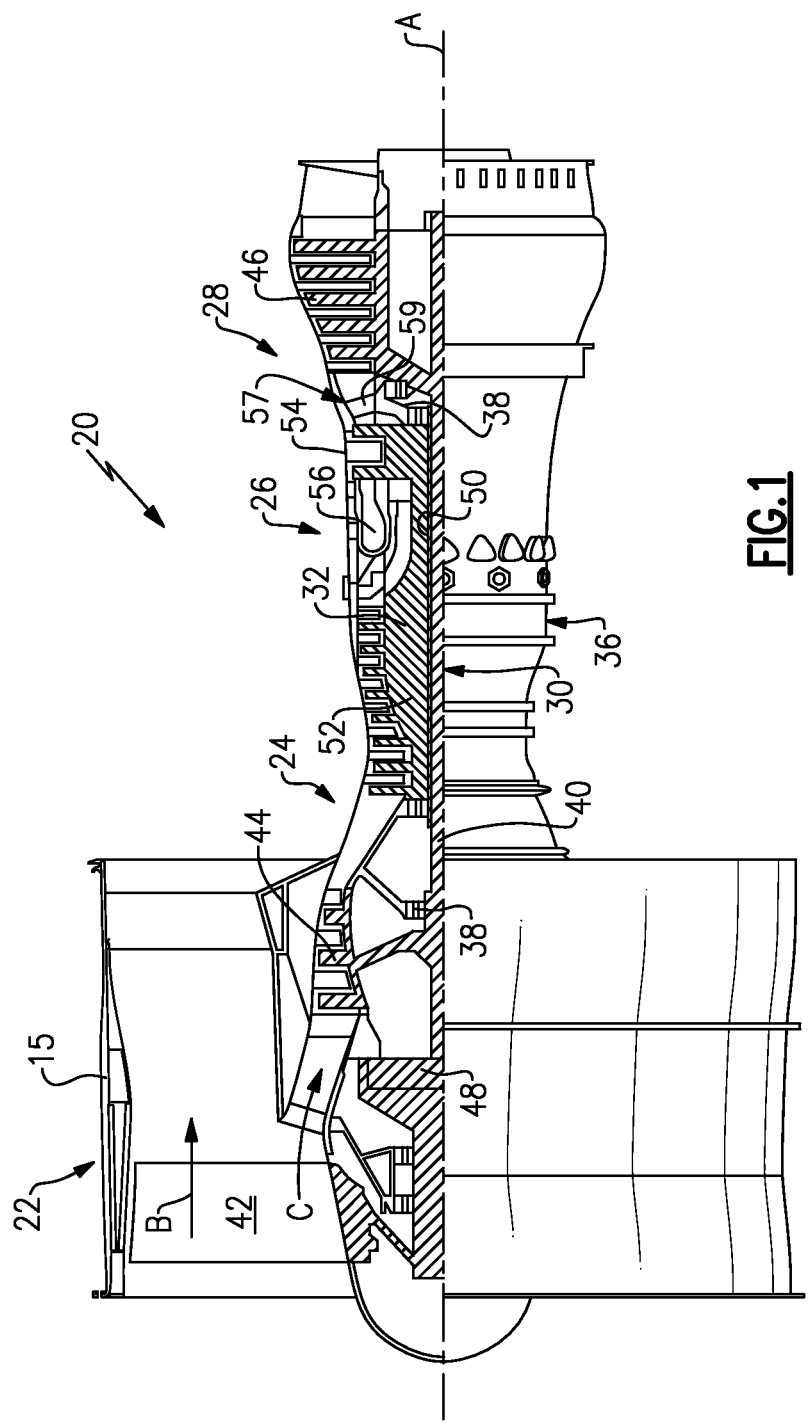
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Fuel is provided to the combustor 56 through multiple fuel nozzles disposed about the combustor 56. The fuel is sprayed into the combustor 56 where it is combined with air from the core airflow path C and ignited. The result of the ignition is expelled into the turbine section 28. The expansion of the combustion gasses through the turbine section 28 drives the turbine section 28 to rotate. In a multi-stage fuel injection system, the combustor section 26 includes multiple stages of fuel injectors. A first stage (group) of fuel injectors constantly provides fuel into the combustor 56 during operation of the gas turbine engine 20, while additional stages of fuel injectors provide fuel into the combustor 56 as required by the operation of the engine. By way of example, these additional stages may typically be utilized when a high amount of thrust is needed in a short period of time, such as at take off.

Figure 2:
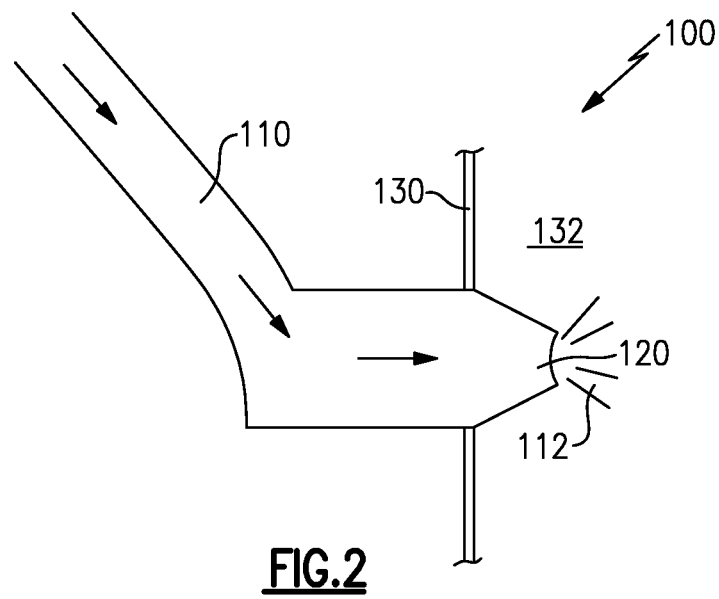
FIG. 2 schematically illustrates a fuel nozzle for a combustor section of the gas turbine engine of FIG. 1.
Figure 3:
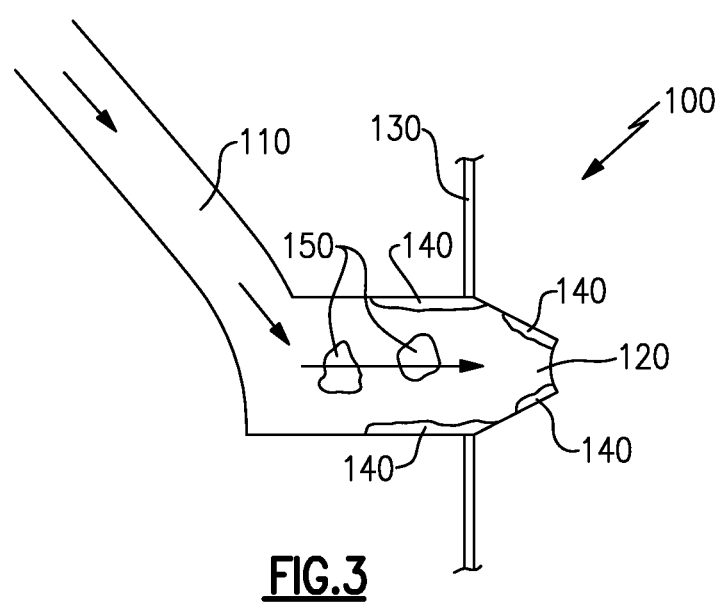
FIG. 3 schematically illustrates the fuel nozzle of FIG. 2 with a coke particulate buildup.

With continued reference to FIG. 1, FIGS. 2 and 3 illustrate an example fuel nozzle 100 for use in the combustor section 26 of FIG. 1. FIG. 2 illustrates the nozzle 100 in a new condition, and FIG. 3 illustrates the nozzle 100 after experiencing excessive temperatures. The fuel nozzle 100 includes a fuel line 110 that provides fuel to a nozzle opening 120. The nozzle opening 120 protrudes through an outer wall 130 of the combustor 66 and sprays fuel 112 into a combustion chamber 132. Each stage of the fuel injection system in the combustor section 26 includes multiple fuel nozzles 100 disposed about the combustor section 26.

In a multi-stage fuel injection system, each nozzle 100 is part of a stage. In an example two stage system, a first stage injects fuel constantly during operation of the gas turbine engine, and the second stage injects fuel only when necessary for an increased thrust. While described herein as having two stages, a multi-staged fuel injection system can include any number of stages and operate in a similar manner.

When the nozzles 100 assigned to the second stage are not in use, fuel may remain held within the nozzle 100. Furthermore, due to the proximity to the combustion, the nozzles 100 heat up to high temperatures when they are not cooled. If the fuel is allowed to heat up beyond a critical coking temperature, coke can begin to buildup in the fuel and on the walls of the nozzle 100. By way of example, an initial coking temperature for a typical jet fuel is approximately 400 F (240.44 C). FIG. 3 illustrates an example nozzle 100 of FIG. 2 after fuel has been maintained in the fuel nozzle 100 at above the critical coking temperature for a period of time.

As can be seen in the example of FIG. 3, coke 140 forms on the interior walls of the nozzle 100. Additional coke particulates 150 can form suspended within the fuel. When the temperature falls below the initial coking temperature, the particulate 150 remains. As a result, if the nozzle 100 is allowed to exceed the initial coking temperature, the coke particulates 140, 150 can build up and clog the nozzle 100, reducing the nozzle's effectiveness, or completely blocking fuel from passing through the nozzle 100. When coke particulates 140, 150 are formed within the nozzle 100, the nozzle must be cleaned out or replaced. The cleaning and replacement process can be tedious and costly.

One factor influencing the initial coking temperature and subsequent rate of coke production of the fuel is the oxygen content present in the fuel. By decreasing the oxygen content in the fuel, the initial coking temperature of the fuel is increased and the rate of coke production decreased proportionally. This increase creates a temperature margin in which fuel can remain uncooled within the nozzle 100, while the particular stage that the nozzle 100 corresponds to is not being utilized. Thus, de-oxygenated fuel can reside in fuel lines at significantly higher temperatures than otherwise possible without forming coke deposits. Utilization of fuel de-oxygenation units to de-oxygenate fuel in existing gas turbine engines requires the fuel de-oxygenations units to be large and heavy, and increases the cost of the gas turbine engine significantly.

Figure 4:
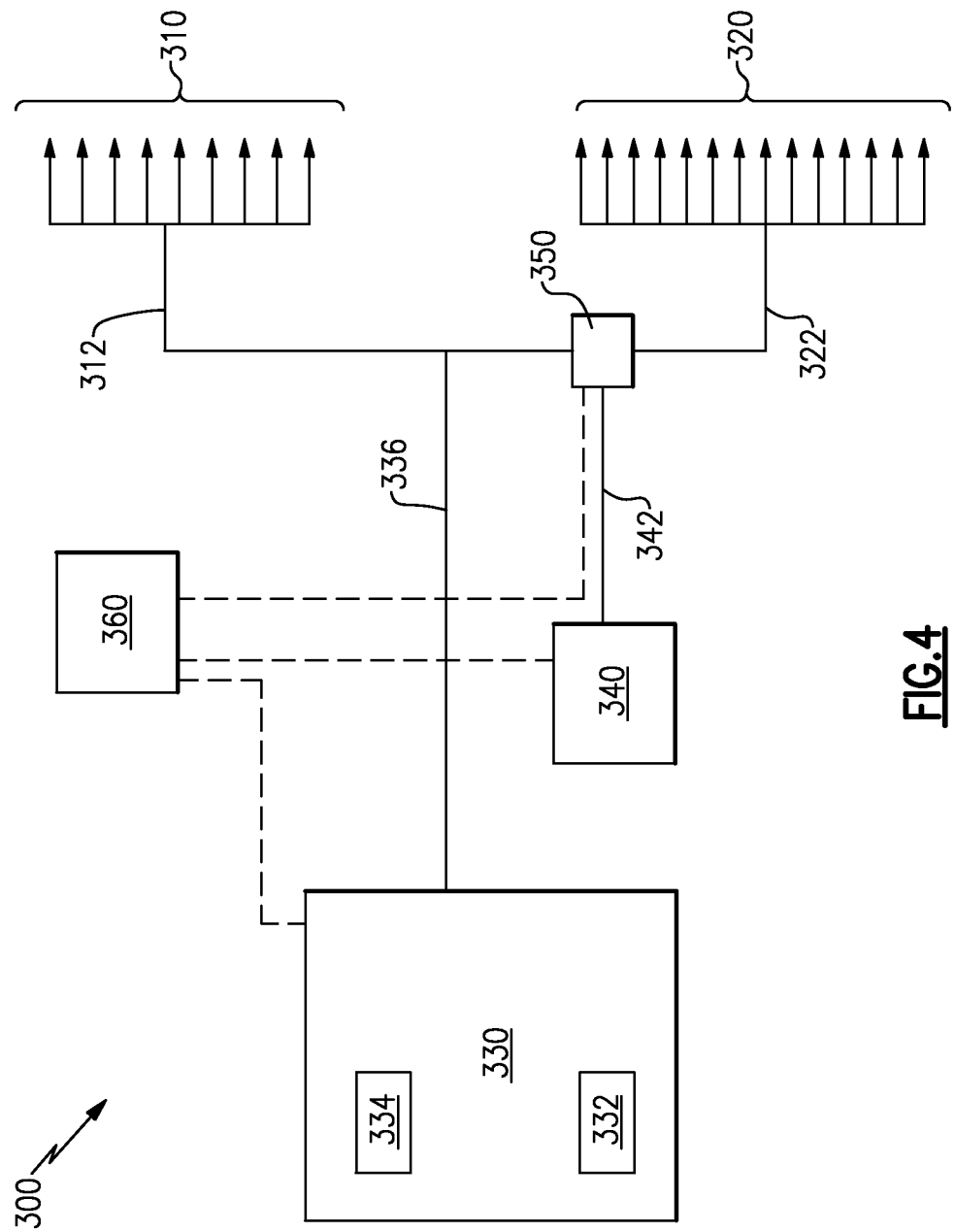
FIG. 4 schematically illustrates an example fuel injection system for a gas turbine engine.

FIG. 4 schematically illustrates an example fuel injection system 300 for a gas turbine engine 20. In order to reduce the cost associated with utilizing de-oxygenated fuel, as well as reducing the size and weight penalties of including a de-oxygenation system in a gas turbine engine, the example fuel injection system 300 of FIG. 4 utilizes a selective de-oxygenation based fuel injection system 300.

The selective de-oxygenation based fuel injection system 300 of FIG. 4 includes a set of first stage fuel injection nozzles 310 and a set of second stage fuel injection nozzles 320. The first stage fuel injection nozzles 310 are directly connected to a main pump module 330 via a fuel line 312 and a fuel line 336. The main pump module 330 includes a pump portion 334, and a reservoir portion 332. The pump portion 334 operates to generate pressure and pass standard aircraft fuel from the reservoir portion 332 to the fuel injector nozzles 310, 320.

The second stage fuel injection nozzles 320 are connected to an output of a selective valve 350 via a fuel line 322. In one example, the selective valve 350 has two states, an open state and a closed state. In other examples, the selective valve 350 can have multiple states encompassing varying open/closed percentages of the selective valve 350. The inputs of the selective valve 350 are connected to two input fuel lines 336 and 342. As described previously, the main fuel line 336 originates at the main pump module 330 and carries standard fuel. The second fuel line 342 is a de-oxygenated fuel line 342 and carries de-oxygenated fuel from a de-oxygenated fuel reservoir 340. The selective valve 350 can be any fluid valve that capable of alternating between fuel from the main fuel module 330 and the de-oxygenated fuel reservoir 340. The de-oxygenated fuel reservoir 340 stores de-oxygenated fuel that has a higher initial coking temperature than the standard oxygenated aircraft fuel.

The selective fuel de-oxygenation based fuel injection system 300 is controlled via a controller 360. In one example the controller 360 is a dedicated fuel injection system controller 360. In other examples the controller 360 can be a general aircraft controller 360, or a general gas turbine engine controller 360.

During standard gas turbine engine 20 operations, fuel is provided only from the first stage fuel injector nozzles 310. When the gas turbine engine begins operating in a staged fashion (such as during takeoff), greater volumes of fuel need to be provided to the combustor 56, the second fuel injector nozzles 320 are switched on by the controller 360, and fuel is provided from both stages of fuel injection nozzles 310, 320. During this phase of operations, the set of second stage fuel injection nozzles 320 are connected to the main fuel module 330 by the selective valve 350.

When the gas turbine engine 20 is switched from the fully stage operation to the cruise, on approach, or idle, less fuel is required in the combustor 56. During the transition, the second stage fuel injection nozzles 320 are switched by the selective valve 350 to a de-oxygenized fuel reservoir 340, and de-oxygenated fuel is provided to the fuel injection nozzles 320. The de-oxygenated fuel is provided to the second stage fuel injection nozzles 320 for a duration of time sufficient to ensure that all of the fuel continued within the second stage fuel injection nozzles 320 is de-oxygenated fuel. The required time period is a calibration value that can be determined by one of skill in the art for any specific fuel injection system.

Once the time period has elapsed, and the second stage fuel injection nozzles 320 contain only de-oxygenated fuel, the second stage fuel injection nozzles 320 are switched off by the controller 360 until such time as fully staged operation phase is required again. In this way, de-oxygenated fuel can be selectively provided to the second stage fuel injection nozzles 320 by the selective valve 350, without requiring the gas turbine engine 20 to use exclusively de-oxygenated fuel.

The above described system ensures that only de-oxygenated fuel is present in the second stage fuel injection nozzles 320 while the second stage fuel injection nozzles 320 are switched off during operation. Thus, the critical coking temperature of the fuel in the second stage fuel injection nozzles 320 is significantly increased, and the second stage fuel injection nozzles 320 can operate without cooling or coking.

In the example fuel-deoxygenating based fuel injection system 300, the fuel reservoir is sized to hold sufficient de-oxygenated fuel to operate the gas turbine engine 20 for several flights, thereby ensuring that the aircraft lands at a facility able to re-fuel the de-oxygenated fuel reservoir before running out of de-oxygenated fuel.

Figure 5:
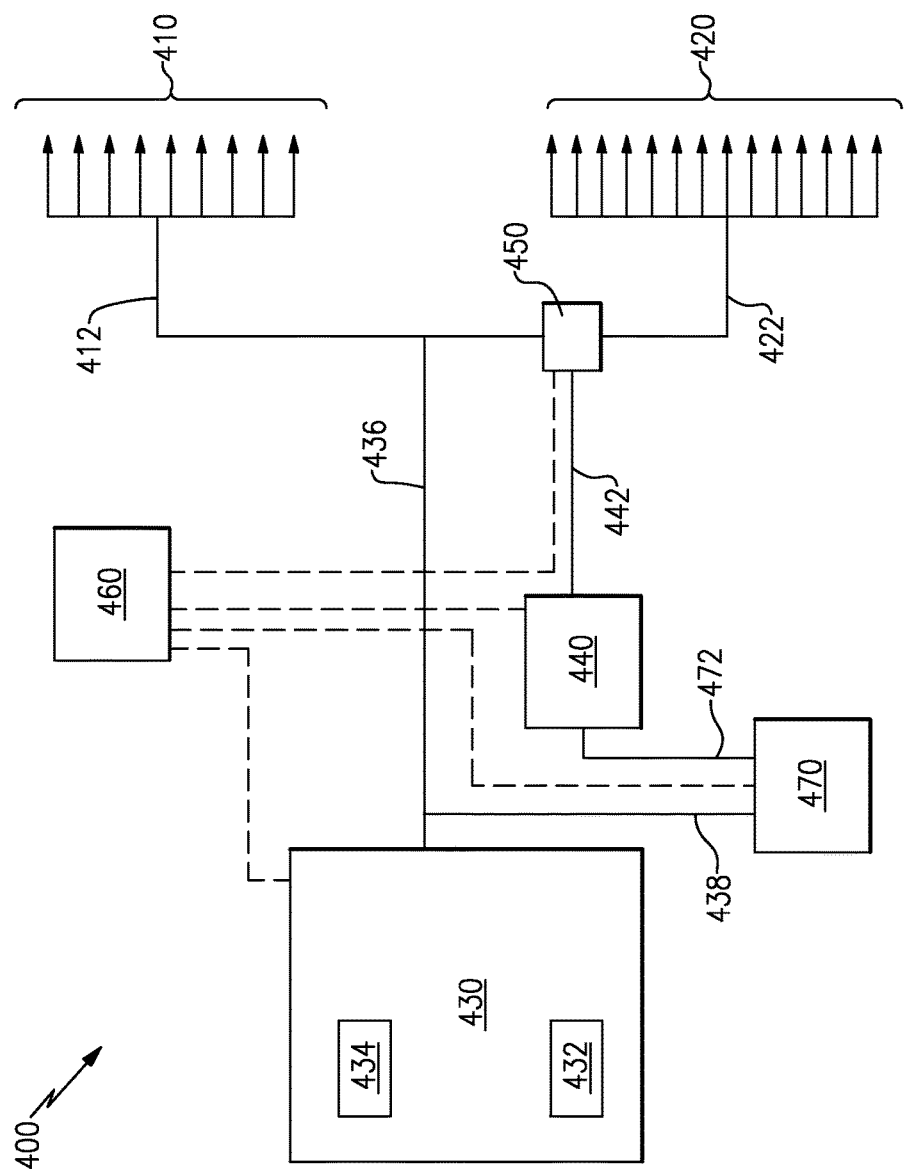
FIG. 5 schematically illustrates an alternate example fuel injection system for a gas turbine engine.

With continued reference to FIGS. 1 and 4, and with like numerals indicating like elements, FIG. 5 illustrates a second example fuel injection system 400. It is understood that in some regions, de-oxygenated fuel is not readily obtainable, and the de-oxygenated fuel reservoir 340 cannot be readily filled in between flights.

As with the fuel injection system of FIG. 4, the selective fuel de-oxygenation based fuel injection system 400 of FIG. 5 includes a set of first stage fuel injection nozzles 410 and a set of second stage fuel injection nozzles 420. The first stage fuel injection nozzles 410 are directly connected to a main pump module 430 via a fuel line 412 and a fuel line 436. The main pump module 430 includes a pump portion 434, and a reservoir portion 432. The pump portion 434 operates to generate pressure and pass standard aircraft fuel from the reservoir portion 432 to the fuel injection nozzles 410, 420. The second stage fuel injection nozzles 420 are connected to a selective valve 450 via a fuel line 422.

The selective valve 450 is connected to two input fuel lines 436 and 442. As described previously, the main fuel line 436 originates at the main pump module 430 and carries standard fuel. The second fuel line 442 is a de-oxygenated fuel line 442 and carries de-oxygenated fuel from a de-oxygenated fuel reservoir 440. The selective valve 450 can be any fluid valve that is capable of alternating between fuel from the main fuel module 430 and the de-oxygenated fuel reservoir 440. The de-oxygenated fuel reservoir 440 contains de-oxygenated fuel that has a higher critical coking temperature.

The selective fuel de-oxygenation system 400 is controlled via a controller 460. In one example the controller 460 is a dedicated fuel injection system 400 controller 460. In other examples the controller 460 can be a general aircraft controller 460, or a general gas turbine engine controller 460.

The selective fuel de-oxygenation system 400 of FIG. 5 differs from the selective de-oxygenation based fuel injection system 300 of FIG. 4, via the inclusion of a fuel de-oxygenator 470. The fuel de-oxygenator 470 draws fuel from the main fuel line 436 via a secondary fuel line 438. The fuel de-oxygenator 470 then de-oxygenates the fuel onboard the aircraft, and provides the de-oxygenated fuel to the de-oxygenated fuel reservoir 440 via a de-oxygenated fuel line 472. The selective fuel de-oxygenation system 400 of FIG. 5 only requires de-oxygenated fuel immediately before transitioning from a fully staged operation to a operation with fewer stages. As a result of this, the de-oxygenation unit 470 can be constructed substantially smaller in both size and weight than a standard de-oxygenation unit.

In the example selective fuel de-oxygenation based fuel injection system 400 of FIG. 5, the reservoir can be sized sufficiently to hold enough de-oxygenated fuel for multiple flights, or sized to provide a reservoir sufficient for a single flight.

Referring now to both FIGS. 4 and 5, it is understood that the engine 20 will only operate fully staged for a limited period of time during each flight. As described above, the de-oxygenated fuel is only required for a limited portion at either the beginning or end of the fully staged operation phase. As a result of both of these factors, the de-oxygenated fuel reservoir 340, 440 can have a limited volume, and requires minimal amounts of fuel at any given time.

While described and illustrated above as two fuel circuits, with one circuit being selectively deoxygenated, it is understood that multiple additional fuel circuits can be utilized in a single gas turbine engine. Furthermore, it is understood that a gas turbine engine utilizing multiple additional fuel circuits can utilize any combination of standard and deoxygenated fuel circuits with minimal modifications to the above disclosure.

Further, while the discussion has focused on lean staged combustion as an example, the disclosed principles apply generically to staging in combustion systems, irrespective of the type of combustion.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a multi-stage fuel injection system including at least a first fuel injection stage and a second fuel injection stage;
   a first fuel reservoir directly fluidly connected to the first fuel injection stage and fluidly connected to a selective valve;
   a second fuel reservoir fluidly connected to the selective valve; and
   wherein one of the first fuel reservoir and the second fuel reservoir is fluidly connected to the second fuel injection stage via the selective valve.

2. A gas turbine engine comprising:
   a multi-stage fuel injection system including at least a first fuel injection stage and a second fuel injection stage;
   a first fuel reservoir fluidly connected to the first fuel injection stage and fluidly connected to a selective valve;
   a second fuel reservoir fluidly connected to the selective valve;
   wherein one of the first fuel reservoir and the second fuel reservoir is fluidly connected to the second fuel injection stage via the selective valve; and
   a controller controllably coupled to the selective valve, and wherein the controller is operable to control a state of the selective valve, the controller including a non-transitory memory storing instructions configured to cause the gas turbine engine to perform the steps of
   transitioning from a first mode of engine operations to a second mode of engine operations by at least connecting a second fuel injector stage of a multi-stage fuel injection system to a de-oxygenated fuel reservoir;
   operating said second fuel injector stage for at least a predefined time period, thereby ensuring that all fuel within the second fuel injector stage is de-oxygenated fuel; and
   switching off the second fuel injector stage, thereby allowing de-oxygenated fuel to remain stagnant in the second fuel injector stage.

3. The gas turbine engine of claim 2, further comprising a fuel de-oxygenation unit having a fuel outlet fluidly coupled to the second fuel reservoir.

4. The gas turbine engine of claim 3, wherein a fuel inlet of said fuel de-oxygenation unit is fluidly coupled to the first fuel reservoir.

5. The gas turbine engine of claim 2, wherein the selective valve fluidly couples the first fuel reservoir to the first fuel injection stage when the selective valve is in a first state, and wherein the selective valve fluidly connects the second fuel reservoir to the second fuel injection stage when the selective valve is in a second state.

6. The gas turbine engine of claim 2, wherein said first fuel injection stage comprises a plurality of fuel injection nozzles, and wherein said second fuel injection stage comprises a plurality of fuel injection nozzles.

7. A method for preventing fuel coking in a multi-stage fuel injection system comprising:
   transitioning from a first mode of engine operations to a second mode of engine operations by at least connecting a second fuel injector stage of a multi-stage fuel injection system to a de-oxygenated fuel reservoir;
   operating said second fuel injector stage for at least a predefined time period, thereby ensuring that all fuel within the second fuel injector stage is de-oxygenated fuel; and
   switching off the second fuel injector stage, thereby allowing de-oxygenated fuel to remain stagnant in the second fuel injector stage.

8. The method of claim 7, further comprising:
   de-oxygenating fuel from a main fuel reservoir using an on-board fuel de-oxygenation unit;
   providing the de-oxygenated fuel from the on-board fuel de-oxygenation unit to the de-oxygenated fuel reservoir.

9. The method of claim 7, wherein the step of connecting a second fuel injector stage of a multi-stage fuel injection system to a de-oxygenated fuel reservoir comprises controlling a state of a selective valve connected to an input of the second fuel injector stage.

10. The method of claim 9, wherein operating the selective valve comprises switching the input of the selective valve from a main fuel reservoir to the de-oxygenated fuel reservoir.

11. The method of claim 9, wherein the state of the selective valve is controlled by a controller.

12. The method of claim 7, wherein switching off the second fuel injector stage, thereby allowing de-oxygenated fuel to remain stagnant in the second fuel injector stage to remain stagnant in the second fuel injector stage is performed while the second fuel injector stage is exposed to temperatures in excess of the coking temperature on non-de-oxygenated fuel.

13. A gas turbine fuel injection system comprising:
a first fuel injector stage having a plurality of fuel injector nozzles;
at least one additional fuel injector stage having a plurality of fuel injector nozzles;
a main fuel module connected to said first fuel injector stage via a main fuel line;
a selective valve having a first input, and second input and an output, the output of the selective valve being connected to the second fuel injector stage;
a de-oxygenated fuel reservoir connected to one of a first fuel input and a second fuel input, and the main fuel line being connected to the other of the first fuel input and the second fuel input; and
a controller coupled to the selective valve and operable to control a state of the selective valve, wherein the controller includes a non-transitory memory storing instructions configured to cause the fuel injection system to perform the steps of
transitioning from a first mode of engine operations to a second mode of engine operations by at least connecting a second fuel injector stage of a multi-stage fuel injection system to a de-oxygenated fuel reservoir;
operating said second fuel injector stage for at least a predefined time period, thereby ensuring that all fuel within the second fuel injector stage is de-oxygenated fuel; and
switching off the second fuel injector stage, thereby allowing de-oxygenated fuel to remain stagnant in the second fuel injector stage.

14. The gas turbine fuel injection system of claim 13, wherein the controller is further controllably coupled to said main fuel module and is operable to control said main fuel module.

15. The gas turbine fuel injection system of claim 13, wherein the main fuel module comprises at least a fuel pump and a main fuel reservoir.

16. The gas turbine fuel injection system of claim 13, further comprising a fuel de-oxygenator fluidly coupled to said main fuel line such that at least a portion of fluid flowing through the main fuel line is diverted to said fuel de-oxygenator.

17. The gas turbine fuel injection system of claim 16, wherein the fuel de-oxygenator comprises an output, and wherein the output is fluidly connected to the de-oxygenated fuel reservoir.

* * * * *

UNITED STATES PATENT AND TRADEMARK OFFICE
CERTIFICATE OF CORRECTION

PATENT NO. : 9,863,322 B2
APPLICATION NO. : 14/599855
DATED : January 9, 2018
INVENTOR(S) : Alexander W. Williams and Stephen K. Kramer It is certified that error appears in the above-identified patent and that said Letters Patent is hereby corrected as shown below:

In the Claims

In Claim 10, Column 9, Line 2; replace "switching the input" with --switching an input--

In Claim 12, Column 9, Line 9-10; delete "to remain stagnant in the second fuel injector stage"

In Claim 12, Column 9, Line 12-13; replace "excess of the coking temperature on non-de-oxygenated fuel." with --excess of a coking temperature of non-de-oxygenated fuel.--

In Claim 13, Column 9, Line 23; replace "to the second fuel" with --to a second fuel--

In Claim 13, Column 10, Line 4-5; replace "connecting a second fuel" with --connecting the second fuel--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*